(12) United States Patent
Wan et al.

(10) Patent No.: US 12,519,402 B2
(45) Date of Patent: Jan. 6, 2026

(54) CONTROLLERS FOR CHAIN-LINK CONVERTERS

(71) Applicant: General Electric Technology GmbH, Baden (CH)

(72) Inventors: Jiqiang Wan, Stafford (GB); Andrew Nolan, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 310 days.

(21) Appl. No.: 18/190,302

(22) Filed: Mar. 27, 2023

(65) Prior Publication Data

US 2023/0327538 A1 Oct. 12, 2023

(30) Foreign Application Priority Data

Apr. 7, 2022 (EP) ..................................... 22275043

(51) Int. Cl.
*H02M 7/483* (2007.01)

(52) U.S. Cl.
CPC ................. *H02M 7/4835* (2021.05)

(58) Field of Classification Search
CPC ............................ H02M 7/4835; H02M 7/483
See application file for complete search history.

(56) References Cited

U.S. PATENT DOCUMENTS

| | | | |
|---|---|---|---|
| 2005/0135031 A1* | 6/2005 | Colby | H02M 7/53832 361/78 |
| 2015/0357931 A1* | 12/2015 | Oates | H02M 7/483 363/89 |
| 2020/0177099 A1* | 6/2020 | Slepchenkov | H02M 7/4835 |
| 2022/0321026 A1* | 10/2022 | Hario | H02M 1/0009 |
| 2023/0087350 A1* | 3/2023 | Arazm | H02M 7/4837 |

FOREIGN PATENT DOCUMENTS

| | | |
|---|---|---|
| EP | 3024109 A1 | 5/2016 |
| WO | 2021159219 A1 | 8/2019 |

OTHER PUBLICATIONS

Extended European Search Report issued in EP Application No. 22275043.2 dated Sep. 20, 2022, 14 pages.

* cited by examiner

*Primary Examiner* — Alex Torres-Rivera
(74) *Attorney, Agent, or Firm* — Eversheds Sutherland (US) LLP

(57) ABSTRACT

A controller, for a chain-link converter having a number of series-connected chain-link modules that are operable in combination to provide a stepped variable voltage source, is programmed to obtain for each chain-link module an indication of whether the current flow through the corresponding chain-link module is in a first flow direction or a second flow direction. The controller is additionally programmed to evaluate the number of indications in the first flow direction and the number of indications in the second flow direction, and thereafter to establish an overall current flow direction through the chain-link converter equal to the flow direction having the largest number of indications.

13 Claims, 1 Drawing Sheet

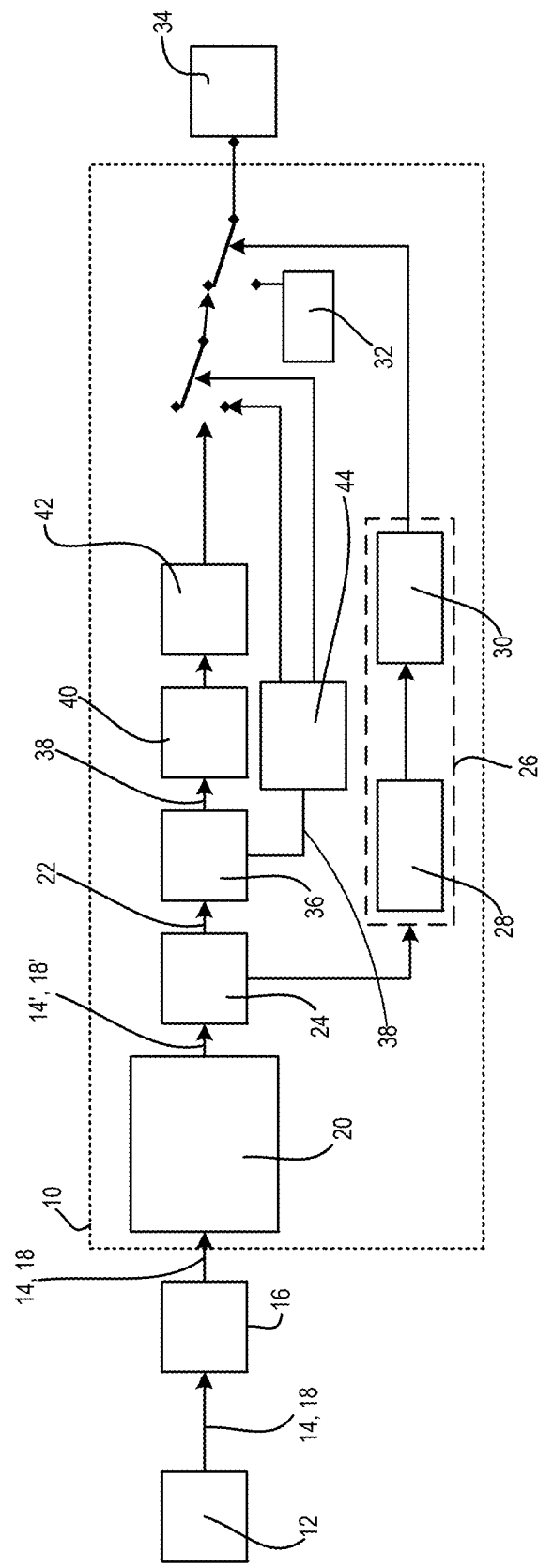

CONTROLLERS FOR CHAIN-LINK CONVERTERS

TECHNICAL FIELD

This invention relates to a controller for a chain-link converter operable to provide a stepped variable voltage source, a chain-link converter including such a controller, a voltage source converter including one or more such chain-link converters, and a method of operating such a controller.

BACKGROUND OF THE INVENTION

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC.

One type of power converter is a voltage source converter, although other types of power converter are also possible.

Such a voltage source converter includes first and second DC terminals between which extends at least one converter limb, and typically three converter limbs each of which corresponds to a given phase of a three-phase electrical power system.

The or each converter limb includes first and second limb portions which are separated by an AC terminal.

In use the first and second DC terminals are connected to a DC network, and the or each AC terminal is connected to a corresponding phase of an AC network.

Each limb portion includes a chain-link converter which extends between the associated AC terminal and a corresponding one of the first or the second DC terminal. Each chain-link converter includes a plurality of series connected chain-link modules, while each chain-link module includes a number of switching elements which are connected in parallel or series with an energy storage device, usually in the form of a capacitor. Other types of energy storage device, i.e. any device that is capable of storing and releasing energy to selectively provide a voltage, e.g. a fuel cell or battery, may also be used however.

The provision of a plurality of chain-link modules means that it is possible to build up a combined voltage across each chain-link converter, via the insertion of the energy storage devices, i.e. the capacitors, of multiple chain-link modules (with each chain-link module providing its own voltage), which is higher than the voltage available from each individual chain-link module.

Accordingly, each of the chain-link modules work together to permit the chain-link converter to provide a stepped variable voltage source. This permits the generation of a voltage waveform across each chain-link converter using a step-wise approximation. As such each chain-link converter is capable of providing a wide range of complex waveforms.

For example, operation of each chain-link converter in the foregoing manner can be used to generate an AC voltage waveform at the or each AC terminal, and thereby enable the voltage source converter to provide the aforementioned power transfer functionality between the AC and DC networks.

SUMMARY OF THE INVENTION

According to a first aspect of the invention there is provided a controller, for a chain-link converter having a plurality of series-connected chain-link modules (12) operable in combination to provide a stepped variable voltage source, the controller being programmed to:
 (a) obtain for each chain-link module an indication of whether the current flow through the corresponding chain-link module is in a first flow direction or a second flow direction;
 (b) evaluate the number of indications in the first flow direction and the number of indications in the second flow direction; and
 (c) establish an overall current flow direction through the chain-link converter equal to the flow direction having the largest number of indications.

Establishing an overall current flow direction through a chain-link converter in the foregoing manner avoids the need to use a Direct-Current Current-Transformer (DCCT) to physically measure the flow of current, and hence determine the direction of flow.

Such DCCT devices represent a single point of potential failure and, in the event of such a fault, the absence of reliable information about the overall current flow direction through a chain-link converter prevents balancing of chain-link module energy storage levels therewithin which can, ultimately, lead to tripping, i.e. shutdown, of the associated chain-link converter and the voltage source converter within which chain-link converter is located.

Moreover, it is often difficult to tell when there is a fault with a DCCT, and so a single fault therewith can cause complete shutdown of a corresponding voltage source converter, with the attendant adverse impact on power transfer, e.g. within a HVDC power transmission network.

Additionally, a DCCT device cannot provide information about the current flow direction through a chain-link converter very quickly because of latency within such a device, particularly when current flow is low due to hysteresis. Consequently, if the associated chain-link converter is experiencing a high level of harmonics, the required balancing of chain-link module energy storage levels, based on the current flow direction information, cannot occur quickly enough which can again lead to an unwanted shutdown.

Also, DCCT devices can be inaccurate, especially when current flow is low, which can lead to them indicating an incorrect direction of current flow. As a result, when current flow is low, the required balancing of chain-link module energy storage levels, based on the current flow direction information, cannot occur correctly which can again lead to an unwanted shutdown.

Also, evaluating the number of indications in the first flow direction and the number of indications in the second flow direction, and then establishing an overall current flow direction through the chain-link converter equal to the flow direction having the largest number of indications, i.e. applying a voting methodology to establishing the overall current flow direction, advantageously helps to eliminate the effect of any faulty modules on the overall current flow direction determination. For example, a single faulty chain-link module can have a large effect on the average energy storage level within the chain-link modules of a chain-link converter, and so attempts to derive the overall current flow direction from such an average energy storage level can be unduly and incorrectly influenced by such a single faulty chain-link module. In contrast, relying instead on each chain-link module providing only a single first or second flow direction indication means that any one erroneous indication amongst many other, typically around a hundred or more, correct indications does not adversely impact on establishing the correct overall current flow direction through the chain-link converter.

Preferably the controller is further programmed to only obtain an indication of the current flow direction for healthy chain-link modules.

Additionally programming the controller in such a way further helps to reduce the adverse influence of any non-healthy chain-link modules, i.e. faulty or otherwise defective chain-link modules that have an energy storage device which is not able to assist in providing an indication of current flow direction through the corresponding chain-link module, on the establishment of an overall current flow direction.

The controller may be programmed to at least one of:
determine itself whether a respective chain-link module is healthy; and
rely on a determination by a respective chain-link module whether it is healthy.

Having a controller programmed in such a way desirably provides flexibility in terms of the overall configuration of the controller and associated chain-link modules since it provides the option of having at least some processing associated with making such a determination to be distributed to one or more respective chain-link modules.

In each instance the determination of whether a respective chain-link module is healthy may include assessing if:
the respective chain-link module has an energy storage device which has been in circuit normally for a first predetermined number of consecutive operating cycles of an associated chain-link converter; and
the level of energy stored by the energy storage device has only been influenced by the current flowing normally in the said associated chain-link converter for a second predetermined number of consecutive operating cycles of the chain-link converter.

Such programming desirably provides a ready way of identifying, and thus ignoring, any faulty chain-link module or otherwise defective chain-link module that is not able to assist in providing an indication of current flow direction through the corresponding chain-link module, and so not useful for establishing an overall current flow direction.

Optionally the controller is programmed to obtain current flow indications by at least one of:
deriving the first or second flow direction indication for a respective chain-link module itself; and
relying on a first or second flow direction indication derived by a respective chain-link module.

Having a controller programmed in such a way advantageously provides further flexibility in terms of the overall configuration of the controller and associated chain-link modules. It similarly provides the option of having at least some processing associated with deriving such first or second flow directions to be distributed to one or more respective chain-link modules.

In each instance the derivation of first or second flow direction indication preferably includes assessing the rate of change of energy stored by a respective chain-link module over time.

Relying on the rate of change of energy stored by a respective chain-link module over time avoids the need instead to utilise an average energy stored over time or a total energy stored over time both of which, as indicated above, can be significantly effected by a single faulty chain-link module, and so attempts to derive the overall current flow direction from such average or total energy storage levels can be unduly and incorrectly influenced by such a single faulty chain-link module.

In a preferred embodiment of the invention assessing the rate of change of energy stored by a respective chain-link module over time to derive the first or second flow direction indication includes establishing a first flow direction indication if the rate of change of energy stored is positive and a second flow direction indication if the rate of change of energy stored is negative.

Such steps advantageously derive the indications of first or second flow direction in a speedy and reliable manner which, in turn, helps to improve the stability of an associated chain-link converter.

In another preferred embodiment of the invention the controller is further programmed to apply filtering to the established overall current flow direction.

Applying filtering to the established overall current flow direction desirably reduces the impact of noise in each of the received energy storage measurements, as well as any noise, i.e. oscillation between first and second flow directions, in the established overall current flow direction, and thus leads to the establishment of an even more accurate and therefore reliable overall current flow direction.

The filtering provided may be one or both of Moving Average filtering and Infinite Impulse Response filtering.

Each such filtering type is advantageously tuneable in manner well suited to reducing the impact of noise in the determinations carried out by the controller of the invention.

Optionally the controller is still further programmed to apply a degree of hysteresis to the established overall current flow direction.

Applying hysteresis to the established overall current flow direction takes advantage of previous established overall current flow directions to reduce the rate at which a new overall current flow direction is established, and thereby helps to eliminate unhelpful fluctuations in the established overall current flow direction.

In a still further preferred embodiment of the invention the controller is additionally programmed to selectively apply modified filtering without hysteresis to the established overall current flow direction.

Such additional programming speeds up establishment of an overall current flow direction through the chain-link converter, e.g. in circumstances when the current flow through the chain-link converter is very low.

Preferably the controller is programmed to elect whether to apply a degree of hysteresis or modified filtering without hysteresis to the established overall current flow direction depending on which results in establishing the overall current flow direction more quickly.

Programming the controller in this manner desirably helps to ensure that the overall current flow direction is established as quickly as possible, e.g. in all current flow conditions.

According to a second aspect of the invention there is provided a chain-link converter comprising a plurality of series-connected chain-link modules and a controller as described hereinabove arranged in operative communication with each chain-link module.

According to a third aspect of the invention there is provided a voltage source converter comprising one or more chain-link converters as set out above.

According to a fourth aspect of the invention there is provided a method of operating a controller, for a chain-link converter having a plurality of series-connected chain-link modules (12) operable in combination to provide a stepped variable voltage source, the method comprising the steps of having the controller:
  (a) obtain for each chain-link module an indication of whether the current flow through the said chain-link module is in a first flow direction or a second flow direction;
  (b) evaluate the number of indications in the first flow direction and the number of indications in the second flow direction; and
  (c) establish an overall current flow direction through the chain-link converter equal to the flow direction having the largest number of indications.

The second, third and fourth aspects of the invention share the benefits of the corresponding features of the controller of the invention.

It will be appreciated that the use of the terms "first" and "second", and the like, in this patent specification is merely intended to help distinguish between similar features (e.g. the first and second flow directions), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWING

There now follows a brief description of preferred embodiments of the invention, by way of non-limiting example, with reference being made to the following FIGURES in which:

FIG. 1 shows a schematic view of a controller according to a first embodiment of the invention.

DETAILED DESCRIPTION

A controller according to a first embodiment of the invention is designated generally by reference numeral 10, as shown in FIG. 1.

The controller 10 is for a chain-link converter (not shown) that is operable to provide a stepped variable voltage, i.e. via the combined operation of a plurality of chain-link modules 12 located therein.

The controller 10 is programmed to, in use, obtain for each chain-link module 12 an indication (22) of whether current flow through the said chain-link module 12 is in a first flow direction or a second flow direction.

More particularly, the controller 10 is programmed to only obtain an indication 22 of the current flow direction for healthy chain-link modules 12.

In the embodiment shown, the controller 10 achieves this by determining 20 itself whether a respective chain-link module 12 is healthy. Such a determination 20 by the controller 10 includes assessing if the respective chain-link module 12 has an energy storage device, e.g. a capacitor (not shown), that has been in circuit normally for a first predetermined number of consecutive operating cycles of an associated chain-link converter, i.e. the chain-link converter (not shown) in which the chain-link module 12 is located. Additionally, the healthy determination 20 by the controller 10 also includes assessing if the level of energy stored by the energy storage device has only be influenced by the current flowing normally in the said associated chain-link converter for a second predetermined number of consecutive operating cycles of the chain-link converter. In other words, the controller 10 assesses if the energy storage device of the respective chain-link module 12 able to contribute to the provision of a stepped variable voltage source or is rapidly discharging energy, such that information, i.e. a current flow indication, from the chain-link module 12 would not be useful for establishing an overall current flow direction.

The first and second predetermined number of consecutive operating cycles of the chain-link converter may be the same in order to avoid disturbance due to switching of the respective chain-link module 12, and preferably is between 1 and 5 operating cycles, although it may be more. Most preferably each of the first and second predetermined numbers is 2 to 3 operating cycles.

In other embodiments of the invention (not shown) the controller may instead be programmed to rely on a determination by a respective chain-link module whether it is healthy, and for that determination to be communicated to the controller, e.g. via a communication network 16, or for any current flow indication or other information allowing such an indication to be obtained to be withheld from the controller by the said respective chain-link module.

In any event, in such other embodiments of the invention such a healthy determination by a respective chain-link module similarly includes assessing if the respective chain-link module's energy storage device, e.g. a capacitor has been in circuit normally for a first predetermined number of consecutive operating cycles of the associated chain-link converter, and if the level of energy stored by the energy storage device has only be influenced by the current flowing normally in the said associated chain-link converter.

Once the controller 10 has determined 20 whether each of a plurality of chain-link modules 12 is healthy, it obtains a current flow indication 22 from the remaining healthy chain-link modules 12.

Again, in the embodiment shown, the controller 10 is programmed to obtain these current flow indications 22 by deriving, itself, the first or second flow direction indication 22 for a respective chain-link module 12. In other embodiments of the invention (not shown) the controller may, instead, be programmed to rely on a first or second flow direction indication 22 that has been derived by a respective chain-link module 12.

In each instance, i.e. irrespective of whether the controller 10 carries out the derivation or a respective, individual, chain-link module 12 carries out the derivation, deriving the current flow indication includes assessing 24 the rate of change of energy stored by a respective chain-link module 12 over time.

More particularly, energy storage measurements 14 from the plurality of chain-link modules 12 are provided to the controller 10 via a communication network 16, although this need not necessarily be the case. Each energy storage device is or includes a capacitor (not shown), and so the energy storage measurements 14 take the form of a capacitor voltage measurements 18.

The healthy chain-link module determination 20 made by the controller 10 means that only energy storage, i.e. capacitor storage, measurements 14', 18' for healthy chain-link modules 12 are further utilised by the controller 10.

More particularly, the aforementioned assessment 24 of the rate of change of energy stored by a respective chain-link module 12 over time includes utilising the energy storage, i.e. capacitor storage, measurements 14', 18' for the healthy chain-link modules 12 to assess 24 the rate of change of capacitor voltage within a respective chain-link module 12 over time, and thereby derive the first or second flow direction indication 22.

More particularly still, if the rate of change of capacitor voltage, i.e. rate of change of energy stored by a respective chain-link module 12, is positive then the controller 10 establishes a first flow direction indication 22, while if the rate of change of capacitor voltage, i.e. rate of change of energy stored by a respective chain-link module 12, is negative then the controller 10 establishes a second flow direction indication 22.

In the other embodiments of the invention in which the controller is programmed to rely on a first or second flow direction indication that has been derived by a respective chain-link module, the or each respective chain-link module may be similarly configured to utilise its own energy storage, i.e. capacitor storage, measurements to assess the rate of change of its capacitor voltage, and thereby similarly derive a first or second flow direction indication.

In still further other embodiments of the invention (not shown), one or more of the chain-link modules may include a current direction sensor to directly detect the current flow direction through the said such chain-link module and to pass such current flow direction information on, as needed. In such other embodiments, i.e. where one or more current direction sensors are utilised, there is no need for a determination of whether or not the associated chain-link module is healthy.

Returning to the embodiment shown the controller 10 is optionally also programmed, when assessing 24 the rate of change of energy stored over time, to determine 26 if no overall current is flowing through the chain-link converter.

The controller 10 does this by summing 28 the rate of change of energy stored over time for each chain-link module assessed and determining 30 that no overall current is flowing when the difference in the number of indications in the first flow direction and the number of indications in the second flow direction is within a particular range, e.g. 10%, of the overall number of chain-link modules 12 for a given amount of time, e.g. 1 second.

If the controller 10 determines that, in use, no overall current is flowing through the chain-link converter it temporarily pauses obtaining first and second flow direction indications 22, and instead establishes that the chain-link modules 12 are temporarily in a state of constant charging 32, i.e. constantly having their level of capacitor voltage charge increased. The controller 10 may additionally provide this constant charging 32 information to other, downstream controller elements 34.

Once the controller 10 determines that an overall current is flowing again, it resumes obtaining first and second flow direction indications 22.

In addition, the controller 10 is programmed, once it has derived for itself respective first or second flow direction indications 22 for each of the healthy chain-link modules 12, to then evaluate the number of indications 22 in the first flow direction and the number of indications 22 in the second flow direction, and to establish 36 an overall current flow direction 38 through the chain-link converter which is equal to the flow direction having the largest number of indications 22.

In this manner the controller 10 applies a voting methodology to establish the overall current flow direction 38, and more particularly relies on each chain-link module 12 providing only a single first or second flow direction indication 22 such that any one erroneous indication 22 amongst many other, typically around a hundred or more, correct indications 22 does not adversely impact on establishing the correct overall current flow direction 38 through the chain-link converter. In other words, each flow direction indication 22 is given the same weighting and the majority of flow direction indications 22 in a particular first or second direction determines the direction established for the overall current flow direction 38 through the chain-link converter. The controller 10 is also programmed to apply filtering 40 to the established overall current flow direction 38. The filtering provided is one or both of Moving Average filtering (MAF) and Infinite Impulse Response (IIR) filtering, although other types of filtering may be used. Preferably the MAF filtering is over three samples.

Additionally, the controller is still further programmed to apply a degree of hysteresis 42 to the established overall current flow direction 38. The degree of hysteresis preferably is +/−5 flow direction indications 22, although other amounts of hysteresis may be added. In any event, the degree of hysteresis is selected to avoid excessive toggling of the established overall current flow direction 38.

Notwithstanding the aforementioned application by the controller 10 of filtering 40 and hysteresis 42 to the established overall current flow direction 38, the controller 10 is additionally programmed to selectively apply modified filtering 44 without hysteresis to the established overall current flow direction 38. Preferably such modified filtering 44 is applied in the event that, in use, a low current is flowing through the chain-link converter, although this need not necessarily be the case.

More particularly, the controller 10 is programmed to elect whether to apply a degree of hysteresis 42 or modified filtering 44 without hysteresis to the established overall current flow direction 38 depending on which results in establishing the overall current flow direction 38 more quickly.

In such circumstances, i.e. when the applied hysteresis 42 responds more slowly or cannot provide a valid output if its input lies within the hysteresis bands within which the chain-link converter current flow direction is changing, and the alternate filtering in 44 responds more quickly and correctly, the controller 10 proceeds directly to establish the overall current flow direction 38.

In addition to the foregoing, low or high current conditions can be characterised. For example, in low current conditions, the result of establishing 36 an overall current flow direction 38 and the filtering 40 may lie within the bands of the hysteresis 42. In contrast, if the output of the filtering 40 lies outside of the hysteresis bands 42, this can be characterised as a high current condition.

These low (or high) current conditions can, in other embodiments, also be dealt with in different ways. For example, applying the modified filtering 44 provides a faster valid output, i.e. establishes an overall current flow direction 38 more quickly, than the data path including hysteresis 42, and so application of the modified filtering 44 can be prioritised in use, if desired.

Additionally, either of these indications could be used to differentiate between high and low current conditions. In high current conditions the application of hysteresis 42 gives the quickest response to a change in current direction, while in low current conditions the application of modified filtering 44 gives the quickest response to a change in current direction.

In any event, whether or not any filtering 40 or hysteresis 42 is applied to the established overall current flow direction 38, the controller 10 may provide the established overall current flow direction 38 to other, downstream controller elements 34.

We claim:

1. A controller, for a chain-link converter having a plurality of series-connected chain-link modules operable in combination to provide a stepped variable voltage source, the controller being programmed to:
   (a) obtain for each chain-link module an indication of whether the current flow through the chain-link module is in a first flow direction or a second flow direction by:
       deriving the first or second flow direction indication for a respective chain-link module itself; and
       relying on a first or second flow direction indication derived by a respective chain-link module,
       wherein in each instance the derivation of first or second flow direction indication includes assessing a rate of change of energy stored by a respective chain-link module over time;
   (b) evaluate a number of indications in the first flow direction and a number of indications in the second flow direction; and
   (c) establish an overall current flow direction through the chain-link converter, applied to chain-link modules whose indications are that the current flow is in the first flow direction and to chain-link modules whose indications are that the current flow is in the second flow direction, equal to the flow direction having the largest number of indications.

2. The controller according to claim 1, further programmed to only obtain an indication of the current flow direction for healthy chain-link modules.

3. The controller according to claim 2, programmed to at least one of:
   determine itself whether a respective chain-link module is healthy; and
   rely on a determination by a respective chain-link module whether it is healthy.

4. The controller according to claim 3, wherein in each instance the determination of whether a respective chain-link module is healthy includes assessing if:
   the respective chain-link module has an energy storage device which has been in circuit normally for a first predetermined number of consecutive operating cycles of an associated chain-link converter; and
   the level of energy stored by the energy storage device has only been influenced by the current flowing normally in the said associated chain-link converter for a second predetermined number of consecutive operating cycles of the chain-link converter.

5. The controller according to claim 1, wherein assessing the rate of change of energy stored by a respective chain-link module over time to derive the first or second flow direction indication includes establishing a first flow direction indication if the rate of change of energy stored is positive and a second flow direction indication if the rate of change of energy stored is negative.

6. The controller according to claim 1, further programmed to apply filtering to the established overall current flow direction.

7. The controller according to claim 6, wherein the filtering provided is one or both of Moving Average filtering and Infinite Impulse Response filtering.

8. The controller according to claim 6, still further programmed to apply a degree of hysteresis to the established overall current flow direction.

9. The controller according to any of claim 6, additionally programmed to selectively apply modified filtering without hysteresis to the established overall current flow direction.

10. The controller according to claim 9, programmed to elect whether to apply a degree of hysteresis or modified filtering without hysteresis to the established overall current flow direction depending on which results in establishing the overall current flow direction more quickly.

11. The chain-link converter comprising the plurality of series-connected chain-link modules and the controller according to claim 1, arranged in operative communication with each chain-link module.

12. The voltage source converter comprising one or more chain-link converters according to claim 11.

13. A method of operating a controller, for a chain-link converter having a plurality of series-connected chain-link modules operable in combination to provide a stepped variable voltage source, the method comprising the steps of having the controller:
   (a) obtain for each chain-link module an indication of whether the current flow through the chain-link module is in a first flow direction or a second flow direction by:
       deriving the first or second flow direction indication for a respective chain-link module itself; and
       relying on a first or second flow direction indication derived by a respective chain-link module,
       wherein in each instance the derivation of first or second flow direction indication includes assessing a rate of change of energy stored by a respective chain-link module over time;
   (b) evaluate a number of indications in the first flow direction and a number of indications in the second flow direction; and
   (c) establish an overall current flow direction through the chain-link converter, applied to chain-link modules whose indications are that the current flow is in the first flow direction and to chain-link modules whose indications are that the current flow is in the second flow direction, equal to the flow direction having the largest number of indications.

* * * * *